United States Patent [19]

Takano

[11] Patent Number: 5,413,473

[45] Date of Patent: May 9, 1995

[54] MECHANISM FOR MOUNTING AND DISMOUNTING MIXER IN AN AUTOMATIC NOODLE MAKING MACHINE

[75] Inventor: Kazuhiko Takano, Kounosu, Japan

[73] Assignee: Sanyo Electric Co., Ltd., Moriguchi, Japan

[21] Appl. No.: 52,765

[22] Filed: Apr. 26, 1993

[30] Foreign Application Priority Data

Apr. 30, 1992 [JP] Japan .................. 4-137736

[51] Int. Cl.$^6$ ................................. A21C 1/14
[52] U.S. Cl. ..................... 425/192 R; 425/190; 425/200; 425/209
[58] Field of Search ............ 425/190, 192 R, 200, 425/202, 209

[56] References Cited

U.S. PATENT DOCUMENTS

| | | | |
|---|---|---|---|
| 3,563,515 | 2/1971 | Chapman | 425/192 R |
| 3,601,859 | 8/1971 | Selbach | 425/192 R |
| 5,158,782 | 10/1992 | Hayashi et al. | 425/135 |

*Primary Examiner*—James P. Mackey
*Attorney, Agent, or Firm*—Darby & Darby

[57] ABSTRACT

A kneading member and a cylinder is easily mounted on and dismounted from a flour kneading unit in an automatic noodle making machine, and a mechanism for mounting and dismounting the mixer of the noodle making machine in which an assembly of the kneading member and the cylinder is removably supported in the clamped state between a stationary support arm and a movable support arm below the ceiling plate of a housing of the noodle making machine, and the opposite ends of the kneading member are detachably supported by a driving rotary member disposed in the stationary support arm and a driven rotary member disposed in the movable support arm to rotate about a center axis of the mixer. To mount the mixer on the flour kneading unit, taper shafts projecting outward of the opposite ends of the kneading member are fitted into corresponding taper holes formed on the driving rotary member and the driven rotary members and when the mixer is dismounted from the flour kneading unit, the taper shafts are disengaged from the taper holes. To hold the movable support arm in the locked state, a turn rod is actuated until it is brought in firm contact with guide rails located between the stationary arm and a support bracket.

11 Claims, 15 Drawing Sheets

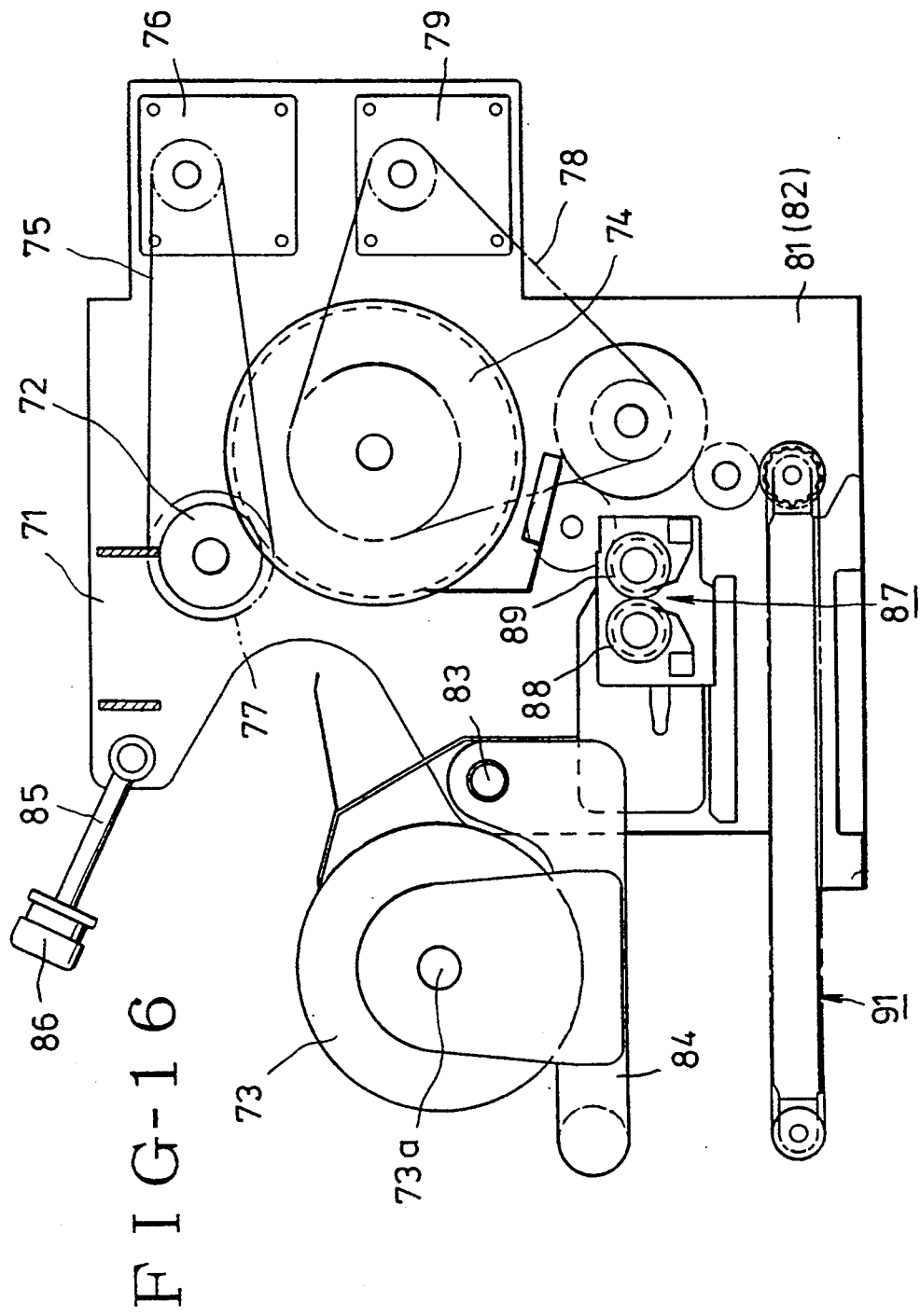

MECHANISM FOR MOUNTING AND DISMOUNTING MIXER IN AN AUTOMATIC NOODLE MAKING MACHINE

BACKGROUND OF THE INVENTION

1. Field of the Invention

The present invention relates generally to an automatic noodle making machine. More particularly, the present invention relates to improvement of a mechanism for mounting and dismounting a mixer in a noodle making machine for automatically producing a noodle such as "wheat vermicelli", "buck-wheat vermicelli", "Chinese vermicelli" or the like.

2. Background Art

A conventional noodle making machine of the foregoing type is constructed as disclosed in an official gazette of Japanese Patent Laid-Open Publication NO. 3-201956 filed by a common applicant to the present invention.

According to this prior invention, the noodle making machine is equipped with a flour kneading unit for preparing a scrambled egg-shaped noodle base by kneading flour in the presence of kneading water in a mixer. The mixer includes as essential components a kneading member and a cylinder in which the kneading member is removably received. The opposite ends of the mixer are rotatably supported in the clamped state by a stationary support arm and a movable support arm both of which are arranged below the ceiling plate of a housing for the noodle making machine. In other words, the mixer is held in a suspended state by supporting rotary members rotatably disposed in the stationary support arm and the movable support arm in such a manner as to rotate about rotary center axes at the opposite ends of the kneading member.

With the conventional mechanism for mounting and dismounting the mixer constructed in the above-described manner, since only the cylinder is removably supported but the kneading member can not be dismounted from the mixer, when the cylinder is to be dismounted from the mixer or when the kneading member is to be cleaned using water, there arises a problem in that noodle base remaining in the cylinder as well as noodle base adhering to the kneading member are scattered away from the cylinder and the kneading member and fall down in the interior of the noodle making machine and/or on the floor surface.

In addition, since a quantitative flour feeding unit including a hopper having flour stored therein is mounted on the ceiling plate of the housing for the noodle making machine, the ceiling plate is liable to deflect, causing the center axes of the rotary members disposed in the stationary support arm and the movable support arm to be displaced away from the original correct positions, resulting in a load to be borne by the rotary members being undesirably increased.

In case that the mixer is mounted in the flour kneading unit by displacing the movable support arm, since a fixing knob is tightened with the operator's one hand while thrusting the movable support arm to the mixer side with the operator's other hand, a mixer mounting operation should be performed with operator's both hands. Thus, a mixer mounting/dismounting operation is troublesome and time-consuming. Further, when the mixer is mounted in the flour kneading unit at a reduced accuracy, the rotation center axes of the rotary members are dislocated away from the original correct positions, causing the kneading member to vibrated as it is rotated. Consequently, the power generated by a driving motor can not smoothly be transmitted to the kneading member.

According to the aforementioned prior invention, since mounting/dismounting of the cylinder as well as cleaning of milling rollers for milling noodle base to prepare noodle band are achieved from the front side (fore surface side) of the noodle making machine, while cleaning of the kneading member and other units in the noodle making machine is achieved from the side wall side (right-hand side wall side) of the noodle producing machine, there arises a problem that the noodle making machine itself is installed at a certain location with much restrictions, resulting in the noodle producing machine being practically used with much inconveniences.

OBJECTS OF THE INVENTION

The present invention has been made in consideration of the aforementioned background.

An object of the present invention is to provide a mechanism for mounting and dismounting a mixer in a noodle making machine wherein a kneading member and a cylinder constituting the mixer can simply be mounted on and dismounted from the mixer.

Another object Of the present invention is to provide a mechanism for mounting and dismounting a mixer in a noodle making machine wherein the kneading member and the cylinder can easily be cleaned using water.

Further object of the present invention is to provide a mechanism for mounting and dismounting a mixer in a noodle making machine wherein the mechanism makes it possible to conveniently use the noodle making machine during each noodle making operation.

BRIEF DESCRIPTION OF THE INVENTION

The present invention provides a mechanism for mounting and dismounting a mixer in an automatic noodle making machine of the type including a quantitative flour feeding unit mounted on a housing of the noodle making machine for quantitatively feeding flour stored in a hopper with the aid of a rotational driving mechanism. There is a flour kneading unit to which the present invention is applied for preparing a scrambled egg-shaped noodle base by kneading the flour fed from the quantitative flour feeding unit in the presence of kneading water with the aid of the mixer. A noodle base milling unit is provided for milling the noodle base prepared in the flour kneading unit to prepare a noodle band, and a noodle band cutting unit for cutting the noodle band into a plurality of ribbon-shaped noodles with the aid of an opposing pair of cutting rollers. The mixer in the flour kneading unit comprises a kneading member and a cylinder in which the kneading member is removably received to rotate about the center axis of the mixer, an assembly of kneading member and the cylinder is removably supported in the clamped state between a stationary support arm and a movable support arm located opposite to the stationary support arm below a ceiling plate of the housing of the noodle making machine, and the opposite ends of the kneading member are detachably supported by rotary members disposed in the stationary support arm and the movable support arm to rotate about their center axes.

With this construction, since the opposite ends of the mixer can operatively be supported in the leftward/- rightward direction relative to the forward/rearward direction of the housing of the noodle making machine, the housing of the noodle making machine can be designed with a small length dimension as measured in the forward/rearward direction. Thus, handling and cleaning of the flour kneading unit can easily be achieved from the front side of the housing of the noodle making machine.

In practical use, the rotary member disposed in the stationary support arm serves as a driving rotary member adapted to be rotated by a driving motor, and the rotary member disposed in the movable support arm serves as a driven rotary member.

In addition, a pair of guide rails extending in parallel with each other are arranged between the stationary support arm and a bracket both of which are fixedly secured to the lower surface of the ceiling plate of the housing so that the movable support arm is slidably displaced in the axial direction of the mixer with the aid of the guide rails each extending through the movable support arm.

To assure that the movable support arm is normally biased toward the stationary support arm side, coil springs are disposed on the guide rails so that the resilient force produced by the coil springs is exerted on the movable support arm.

When the mixer is mounted on the flour kneading unit, taper shafts, axially projected outward of the opposite ends of the kneading member while extending along the center axis of the mixer to serve as position determining means, are fitted into taper holes formed on the driving rotary member and the driven rotary member. In addition, taper pins axially projected outward of the opposite ends of the kneading member at the positions located radially offset from the taper shafts to serve as power transmitting means are fitted into taper holes or annular engagement grooves formed on the driving rotary shaft and the driven rotary member.

When the mixer is dismounted from the flour kneading unit, the taper shafts and the taper pins are disengaged away from the corresponding taper holes and/or the corresponding engagement grooves so that an assembly of the kneading unit and the cylinder can be removed from the flour kneading unit.

To hold the movable support arm in the locked state, a turn rod serving as engaging/disengaging means is inserted through the movable support arm directly below the guide rails at a substantially right angle relative to the center axis of the mixer. When the turn rod is slightly raised up until the latter comes in firm contact with the slide rails with the aid of an eccentric collar fitted into the movable support arm, the movable support arm is kept immovable. When the turn rod is displaced in the opposite direction, the movable support arm is displaced out of engagement from the guide rails so as to enable an assembly of the kneading member and the cylinder to be dismounted from the flour kneading unit.

With the mechanism of the present invention, since mounting and dismounting of the mixer can be achieved while the kneading member is received in the cylinder, the problem does not arise that the remaining noodle base in the mixer is scattered away from the mixer when the latter is dismounted from the flour kneading unit.

In addition, since the mixer can easily be exchanged with another one, various kinds of noodle such as "wheat vermicelli" having poor foodstuff toughness, "buckwheat vermicelli" having high foodstuff toughness or the like can be produced in conformity from the requests raised from users with a single noodle making machine.

Other objects, features and advantages of the present invention will become apparent from reading of the following description which has been made in conjunction of the accompanying drawings.

BRIEF DESCRIPTION OF THE DRAWINGS

The present invention is illustrated in the following drawings in which:

FIG. 16 is another sectional view of the noodle base milling unit, particularly showing a second milling roller displaced away from a first milling roller and a third milling roller.

DETAILED DESCRIPTION OF THE PREFERRED EMBODIMENTS

The present invention will now be described in detail hereinafter with reference to the accompanying drawings which illustrate a preferred embodiment.

Figure 2:
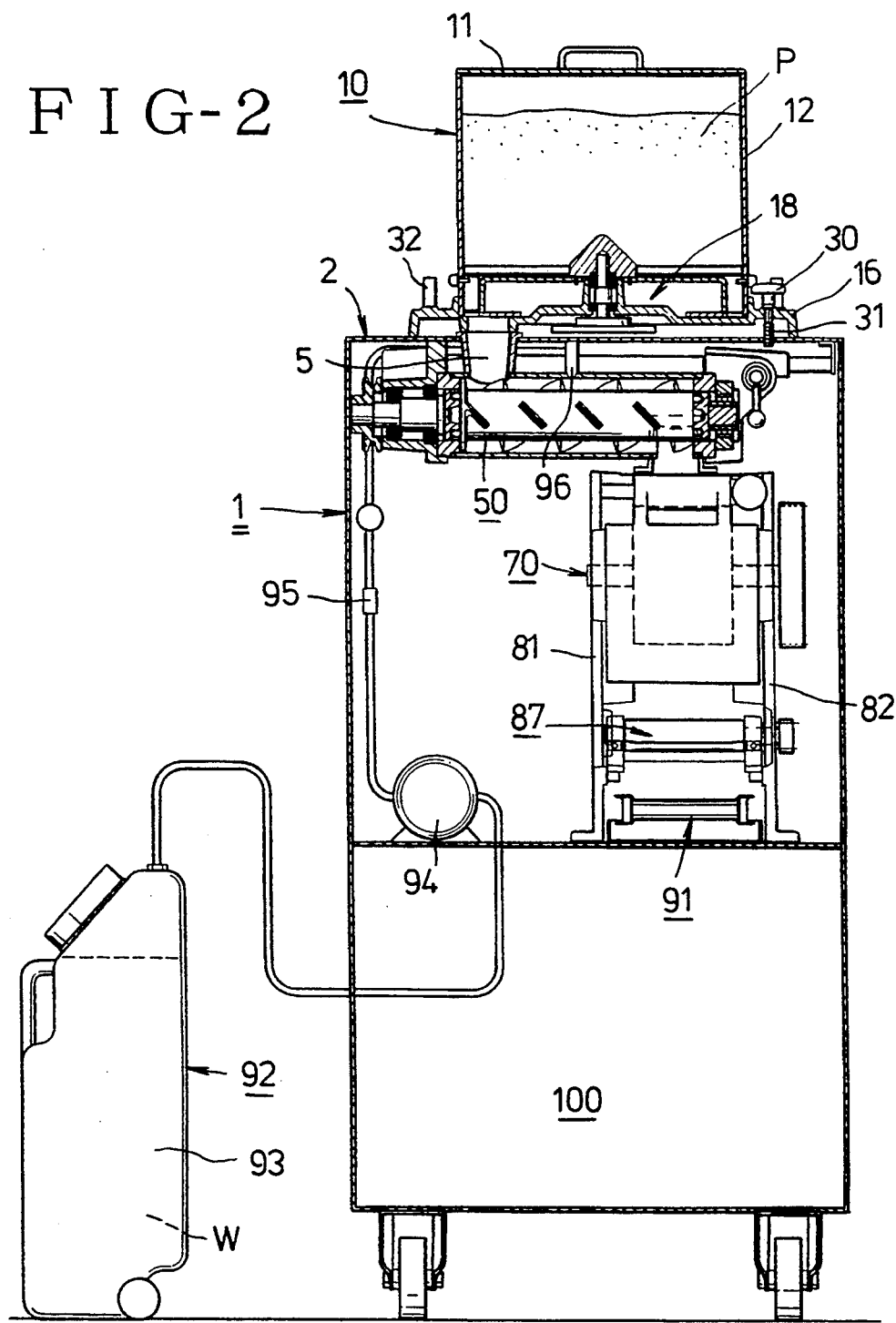
FIG. 2 is a vertical sectional front view of the noodle making machine, schematically showing the entire structure of the noodle making machine.
Figure 3:
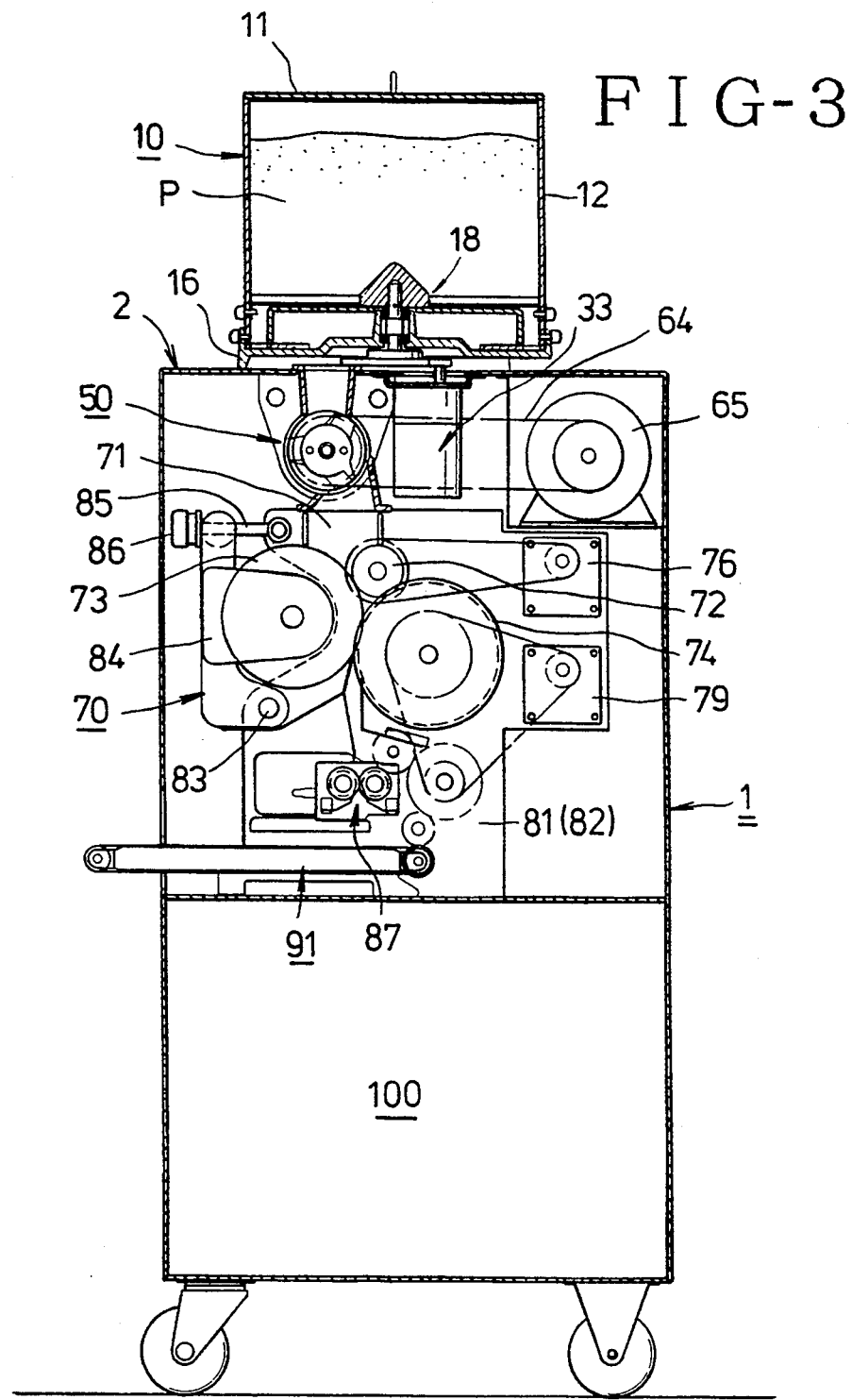
FIG. 3 is a vertical sectional side view of the noodle making machine, schematically showing the entire structure of the noodle making machine.
Figure 4:
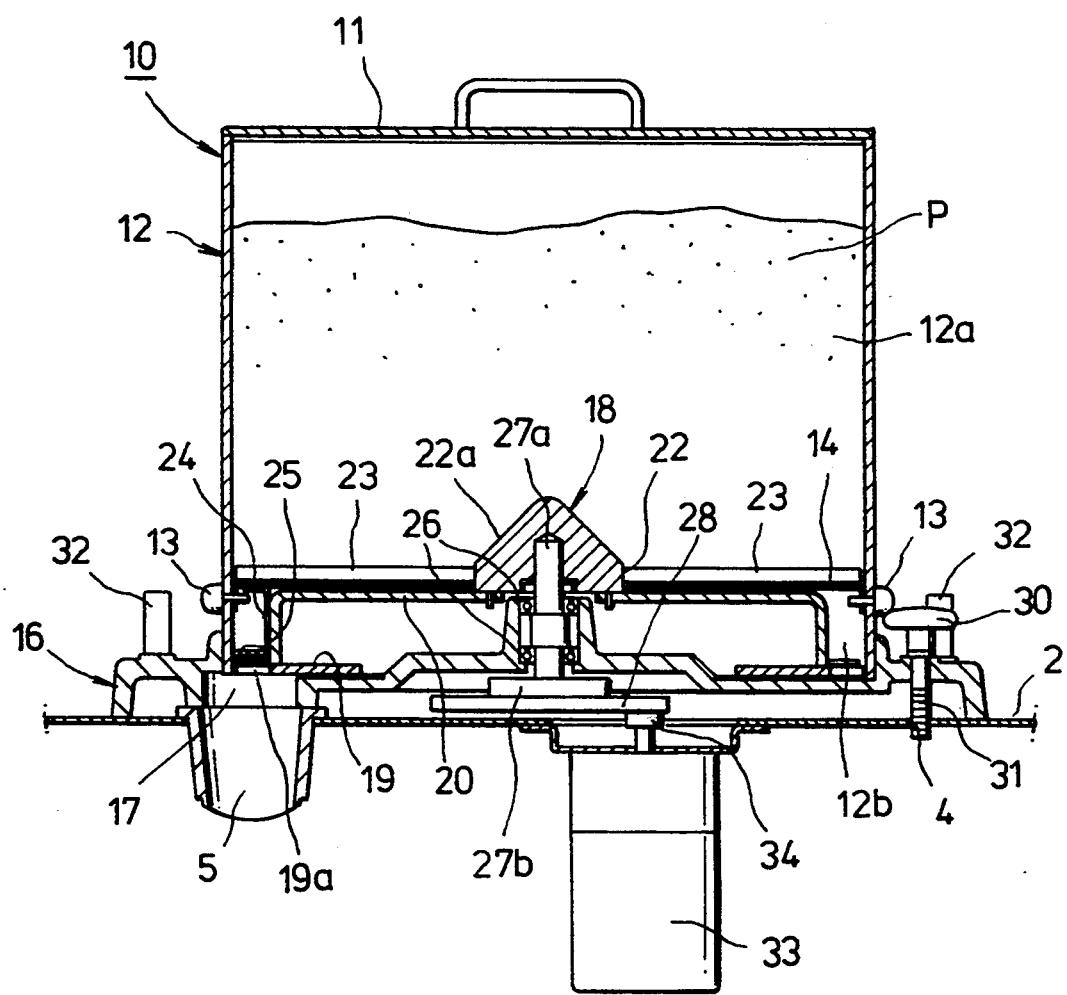
FIG. 4 is a vertical sectional side view of a quantitative flour feeding unit mounted on a housing of the noodle making machine, particularly showing essential components constituting the quantitative flour feeding unit in an enlarged scale.
Figure 5:
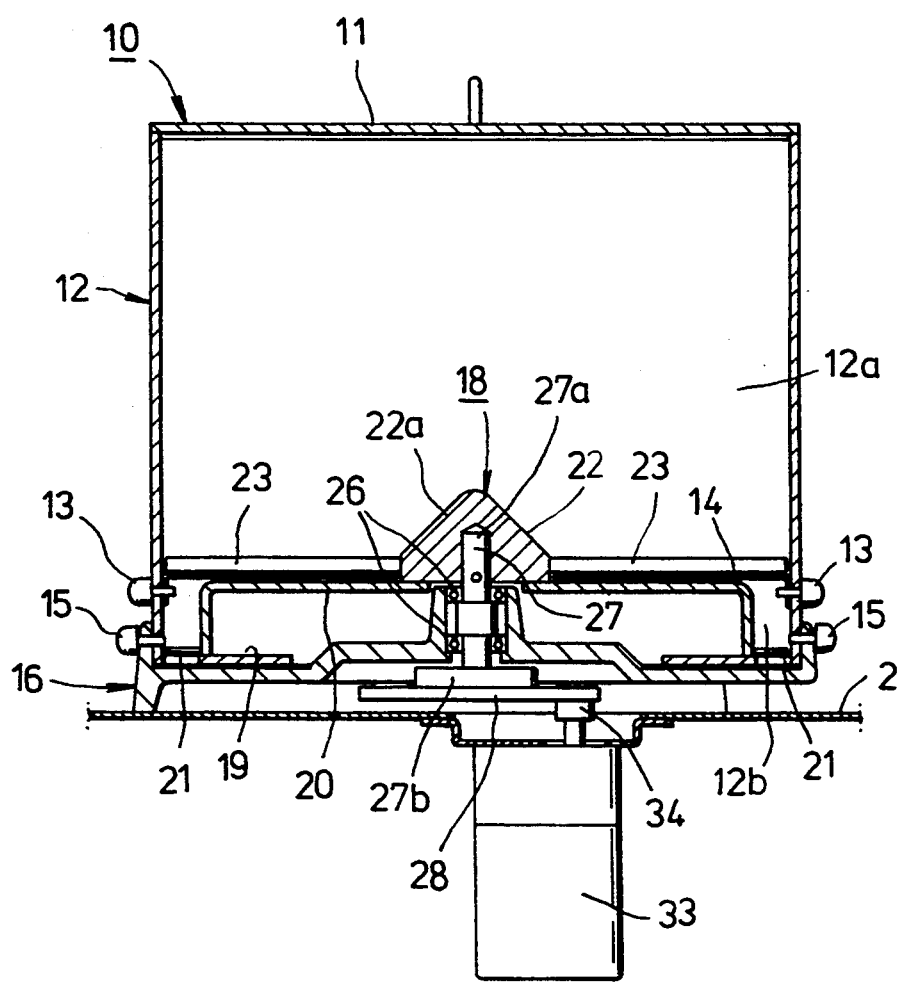
FIG. 5 is a sectional plan view of the quantitative flour feeding unit, particularly showing essential components constituting the quantitative flour feeding unit in an enlarged scale.

Among the drawings, FIG. 2 and FIG. 3 show by way of sectional views the entire structure of a noodle making machine having a flour kneading unit incorporated therein constructed according to the embodiment of the present invention. In the drawings, reference numeral 1 designates a housing of the noodle producing machine.

The housing 1 includes a ceiling plate 2 on which a quantitative flour feeding unit 10 is mounted in which flour P is stored.

As shown in FIG. 4 to FIG. 7, the quantitative flour four feeding unit 10 includes as essential components a transparent cylindrical hopper 12 covered with a lid plate 11, a partition plate 14 fastened to the hopper 12 by tightening a plurality of screws 13 for separately dividing the hopper 12 into an upper storing section 12a and a lower storing section 12b, a support platform 16 to which the bottom of the lower storing section 12b of the hopper 12 is fastened by tightening a plurality of screws 15, and a rotational driving mechanism 18 mounted on the support platform 16 for feeding flour P stored in the lower storing section 12b into a mixer 51 arranged in a flour kneading unit 50 via a flour outfeed port 17, and these components are removably assembled together to constitute the quantitative flour feeding unit 10. The mixer 51 in the flour kneading unit 50 will later be described in detail.

The partition plate 14 is intended to prevent the density of flour P from varying when the dead weight of flour P stored in the upper storing section 12a is exerted directly on the flour P stored in the lower storing section 12b, and a plurality of holes 14a are formed through the partition plate 14 around the peripheral part of the same so as to allow the flour P stored in the upper storing section 12 to fall down in the lower storing section 12b through the holes 14a.

A rotational driving mechanism 18 for quantitatively feeding the flour P stored in the upper storing section 12a to the mixer 51 includes as essential components an annular slide plate 19 made of a sheet of stainless sheet and detachably attached to the bottom surface of the support platform 16 with a flour outfeed port 19a formed thereon corresponding to the flour outfeed port 17, a rotary member 20 slidably arranged on the slide plate 19, a plurality of rotary fingers 21 each composed of a leaf spring of stainless steel and arranged in the equally spaced relationship as seen in the circumferential direction with a flour receiving portion 21 having a predetermined area formed between adjacent rotary fingers 21 while projecting outward of the rotary member 20, a stirring member 22 detachably arranged at the central part of the rotary member 20 with a head 22a located in the upper storing section 12a of the hopper 12 to rotate in synchronization with the rotary member 20, a plurality of stirring rods 23 (three stirring rods in the shown embodiment) projecting outward of the head 22a of the stirring member 22 to stir the flour P stored in the upper storing section 12a above the partition plate 14, and a cover plate 24 located above the rotary fingers 21 at the position corresponding to the flour outfeed port 17 formed on the support platform 16.

The cover plate 24 is intended to prevent the flour P stored in the lower storing section 12b from falling down directly through the flour outfeed port 17, and a part of the cover plate 24 is bent in the downward direction to form a projection 25 adapted to successively come in contact with the rotary fingers 21 each composed of a leaf spring when each rotary finger 21 passes past the flour outfeed port 17.

The rotary member 20 of the rotational driving mechanism 18 is rotatably supported by bearings 26 received in the central part of the support platform 16, and the rotational force generated by a first driving motor 33 is transmitted to the stirring member 22 detachably fitted onto an upper end 27a of a rotational shaft 27. A lower end 27b of the rotational shaft 27 is projected downward of the support platform 16 so that a follower gear 28 fitted onto the lower end 27b of the rotational shaft 28 meshes with a driving gear 34 of the first driving motor 33 serving as power transmitting means to be described later.

A V-shaped guide groove 29 serving as position determining means is formed at one corner of the support platform 16, and a locating pin 3 projecting upward of the ceiling plate 2 of the housing 1 is brought in engagement with the V-shaped guide groove 29.

A stationary knob 30 is disposed on the support platform 16 at another corner of the support platform 16 diametrically located opposite to the foregoing corner of the same, and a male-threaded portion 31 of the stationary knob 30 is threadably engaged with a female-threaded hole 4 formed through the ceiling plate 2 of the housing 1.

In the drawings, reference numerals 32 designate a pair of handles. The quantitative flour feeding unit 10 constructed in the above-described manner can manually be raised up by seizing the handles 32 with the operator's hands.

The first driving motor 33 is fixedly secured to the lower surface of the ceiling plate 2 of the housing 1, and the driving gear 34 of the first driving motor 33 is projected above the ceiling plate 2 of the housing 1.

When the quantitative flour feeding unit 10 is mounted on the ceiling plate 2 of the housing 1, first, the support platform 16 is raised up by seizing the handles 32 with operator's hands and it is then placed on the ceiling plate 2 of the housing 1.

Subsequently, the locating pin 3 standing upright from the ceiling plate 2 of the housing 1 is engaged with the V-shaped guide groove 29 formed on the support platform 16 and the male-threaded portion 31 of the stationary knob 30 is then threadably engaged with the female-threaded hole 4 formed through the ceiling plate 2 of the housing 1, whereby the quantitative flour feeding unit 10 is removably mounted in position on the ceiling plate 2 of the housing 1, and at the same time, the follower gear 28 fixedly mounted on the rotational shaft 27 of the driving mechanism 18 meshes with the driving gear 34 of the first driving motor 33.

As the first driving motor 33 rotates, the rotary member 20 and the stirring member 22 of the rotational driving mechanism 18 are rotated in synchronization with the first driving motor 33 via the rotational shaft 27 so that the flour P stored in the upper storing section 12a located above the partition plate 14 of the hopper 12 falls down in the lower storing-section 12b through the holes 14a formed through the partition plate 14 around the peripheral part of the same to enter the flour receiving portion 21a formed between adjacent rotary fingers 21 while it is stirred by the stirring rods 23 radially extending from the head 22a of the stirring member 22.

Figure 8:
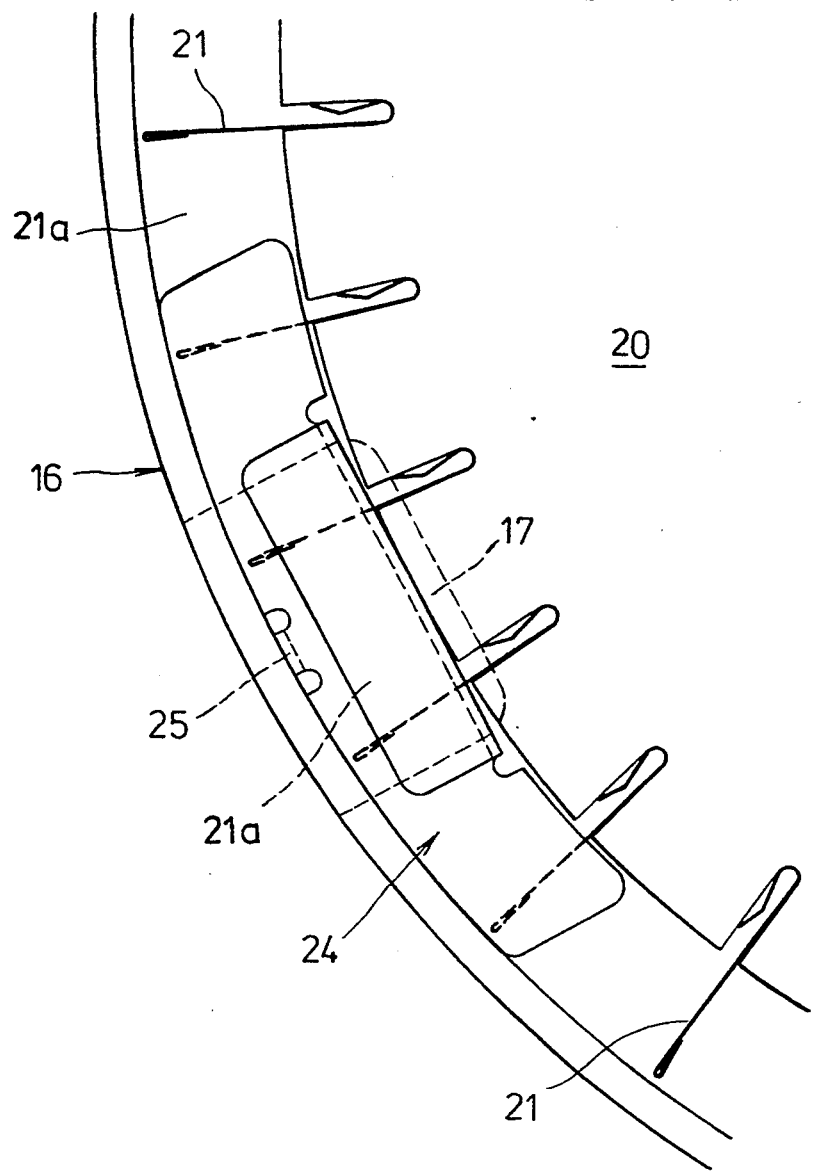
FIG. 8 is a fragmentary enlarged plan view of the quantitative flour feeding unit, particularly showing several essential components constituting the quantitative flour feeding unit.

As shown in FIG. 8, the flour P received in the flour receiving portion 21a in that way is rotationally displaced on the slide plate 19 placed on the bottom plane of the support platform 16 as the rotary member 20 is rotated. When the flour P reaches the outfeed port 19a on the slide plate 19, it falls down through the outfeed port 17 by its own dead weight so that it is quantitatively fed into the mixer 51 of the flour kneading unit 50 via the flour outfeed port 17 on the support platform 16 located corresponding to the flour outfeed port 19a and the chute 5 disposed on the ceiling plate 2 of the housing 1.

As the rotary member 20 is rotated, the rotary fingers 21 each composed of a leaf spring are successively brought in contact with the projection 25 of the cover plate 24 to deflect at the substantially same time when the flour P falls down through the outfeed port 19a of the slide plate 19. Subsequently, as the rotary member 20 is rotated further, the rotary fingers 21 are resiliently released from the deflected state induced by the projection 25 of the cover plate 24, causing the rotary fingers 21 to vibrate. Consequently, the flour P received in the flour receiving portion 21 defined by the adjacent rotary fingers 21 and the outer periphery of the rotary member 20 is completely flown away from the rotary fingers 21 so that it is fed into the mixer 51 of the flour kneading unit 50 at a high accuracy in respect of a quantity of fed flour.

In the shown embodiment, the quantity of feeding of flour P into the mixer 51 of the flour kneading unit 50 can adjustably be determined depending on the number of flour receiving portions 21a each passing past the outfeed port 19a on the slide plate 19 as the rotary member 20 is rotated, on the assumption that the quantity of flour P received in a single flour receiving portion 21a is taken as a unit.

Thus, a predetermined quantity of flour P can be fed into the mixer 51 of the flour kneading unit 50, provided that a rotating time of the rotary member 20 is preset by a timer (not shown) and a predetermined number of flour receiving portions 21a successively reaches the outfeed port 19a of the slide plate 19.

Alternatively, a predetermined quantity of flour P can be fed into the mixer 51 of the flour kneading unit 50 by employing a process wherein circumferential displacement of each flour receiving portion 21a caused by rotation of the rotary member 20 is detected by a sensor (not shown) so as to enable the number of flour receiving portions 21a which successively reach the flour outfeed port 19a of the slide plate 19 as the rotary member 20 is rotated to be preset.

Figure 6:
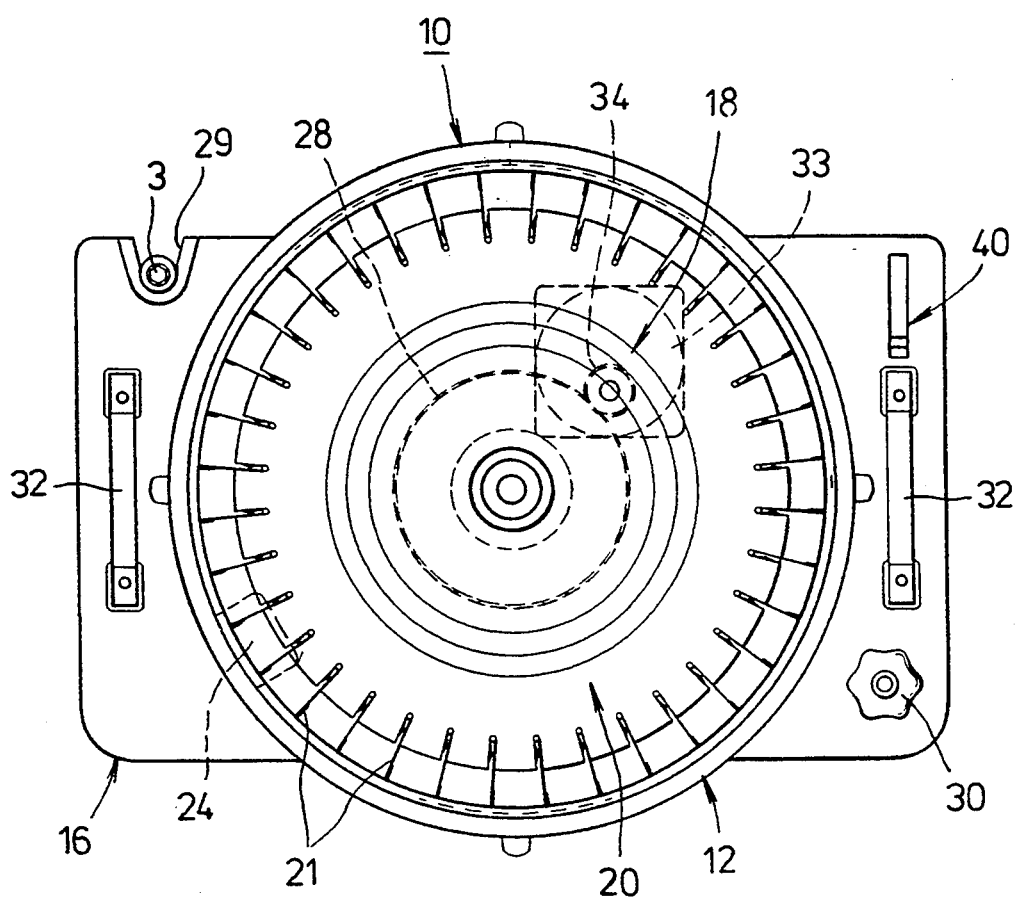
FIG. 6 is a sectional plan view of the quantitative flour feeding unit, particularly showing a few essential components constituting the quantitative flour feeding unit in an enlarged scale.
Figure 7:
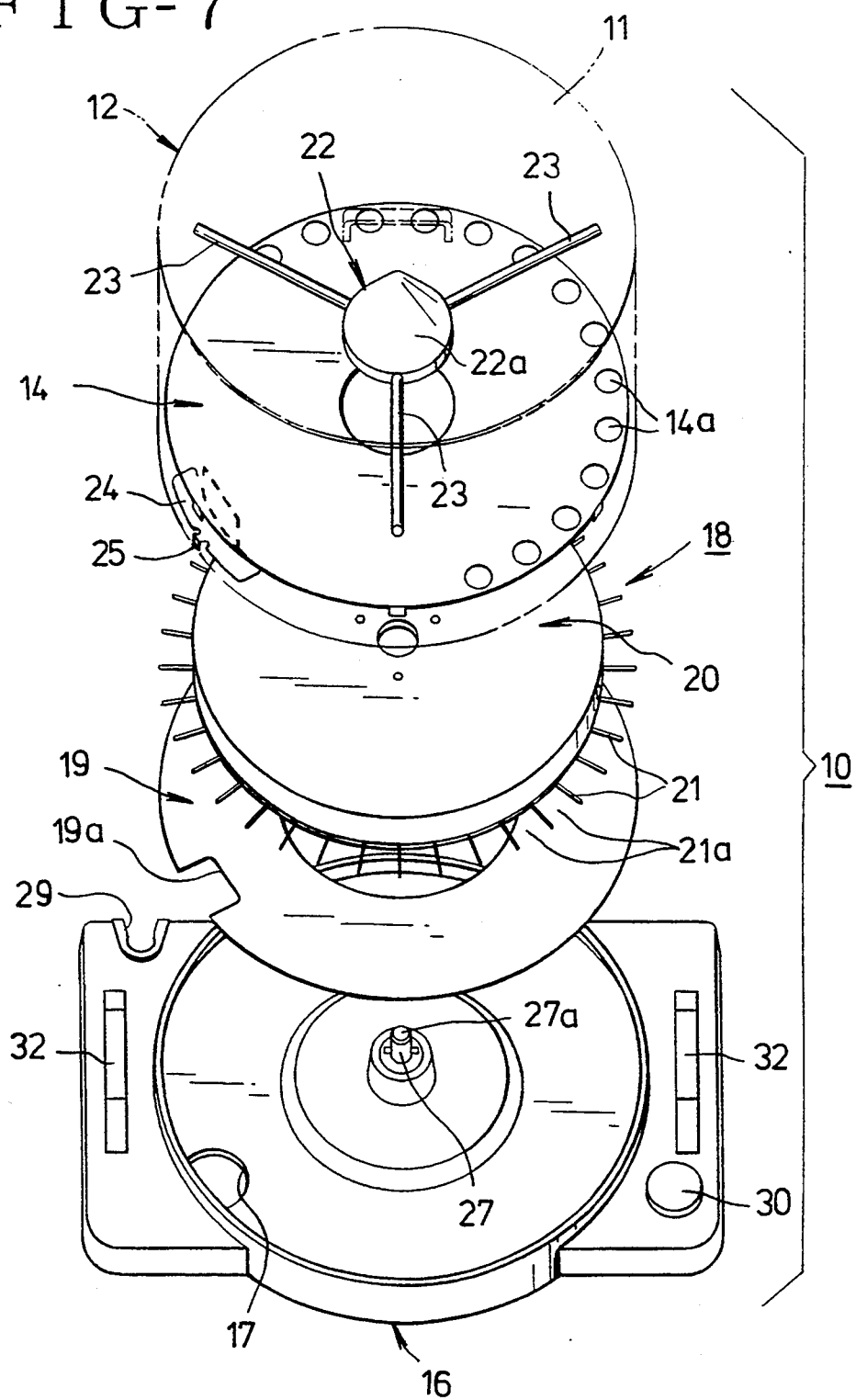
FIG. 7 is a perspective view of the quantitative flour feeding unit, particularly showing several essential components constituting the quantitative flour feeding unit in the disassembled state.

In FIG. 6, reference numeral 40 designates a flour kind discriminating unit which is disposed on the support platform 16 of the quantitative flour feeding unit 10 to determine and indicate what kind of flour P is used for the noodle making machine at present. A program for discriminating what kind of flour is fed to the quantitative flour feeding unit 10 at present is installed in the flour kind discriminating unit 40 corresponding to each of the kinds of flour to be used for the noodle producing machine. In addition, the flour kind discriminating unit 40 controls a driving system for driving a flour kneading unit 50 and a noodle base milling unit 70 both of which will be described in detail later.

Figure 1:
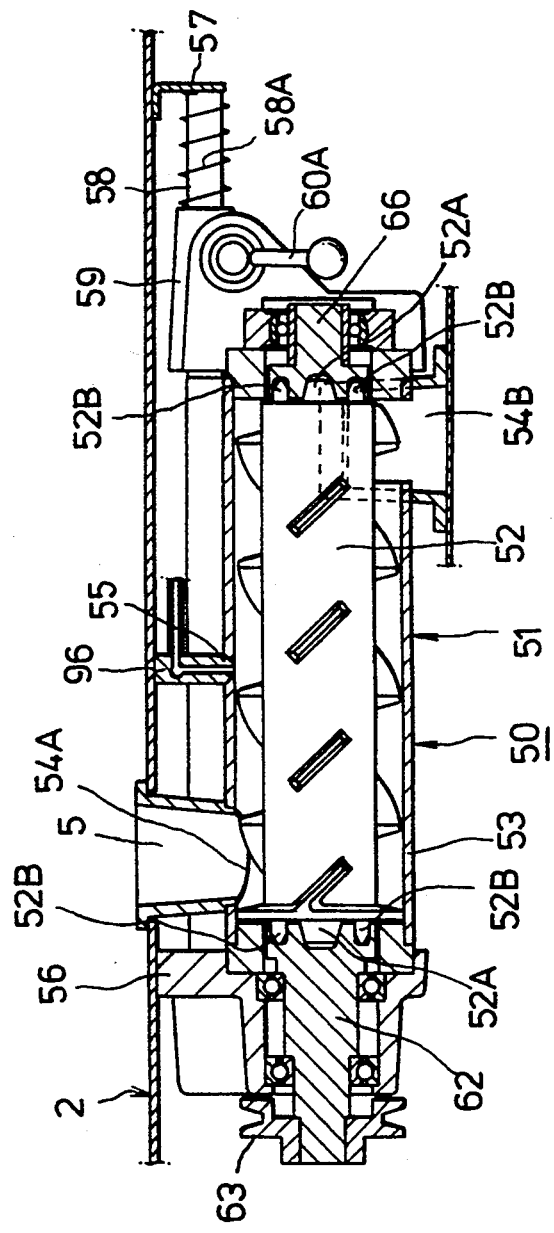
FIG. 1 is a vertical sectional view of a mechanism for mounting and dismounting a mixer in a noodle making machine constructed according to an embodiment of the present invention, particularly showing essential components constituting the mechanism in an enlarged scale.

As shown in FIG. 1, the flour kneading unit 50 includes a mixer 51 for preparing a scrambled egg-shaped noodle base by kneading the flour P fed from the quantitative flour feeding unit 10 in the presence of kneading water W. The mixer 51 includes a kneading member 52 and a cylinder 53 as essential components, and the kneading member 52 is rotatably received in the cylinder 53 while extending in the axial direction in such a manner that it can separately be disassembled from the cylinder 53.

A flour infeed port 54A, a kneading water infeed port 55 and a noodle base outfeed port 54B are formed on the cylinder 53 so that flour P and kneading water W are fed in the space defined between the kneading member 52 and the cylinder 53. The flour infeed port 54A communicates with the chute 5 through which a predetermined quantity of flour P is fed from the quantitative flour feeding unit 10 via the flour outfeed port 17. The kneading water infeed port 55 communicates with a kneading water ejecting nozzle 96 which is connected to a kneading water feeding unit 92 to be described later. Further, the noodle base outfeed port 54B is communicates with a noodle base storing section 71 of a noodle base milling unit 70 to be described later.

Figure 9:
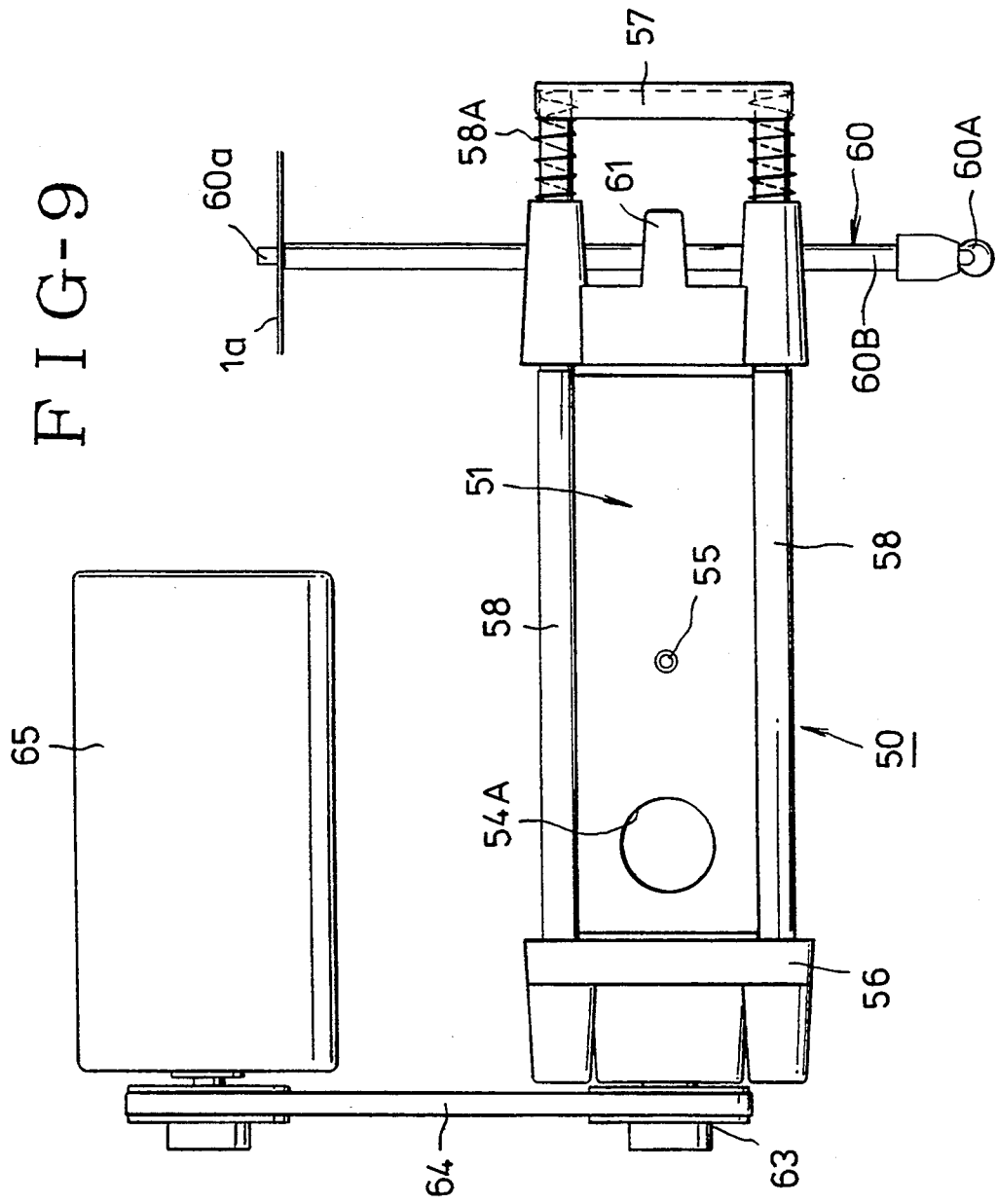
FIG. 9 is a schematic plan view of a flour kneading unit, particularly showing a mixer arranged in the flour kneading unit.

As shown in FIG. 9, the mixer 51 is arranged between a stationary support arm 56 and a bracket 57 both of which are located opposite to each other below the ceiling plate 2 of the housing 1. In addition, a pair of guide rails 58 are arranged between the stationary support arm 56 and the bracket 57 while extending in parallel with each other in the axial direction, i.e, in the leftward/rightward direction relative to the forward/rearward directions of the housing 1.

A movable support arm 59 normally biased toward the stationary support arm 56 side with the aid of coil springs 58A disposed between the bracket 57 and the movable support arm 59 is slidably supported by the guide rails 58. A turn rod 60 of which one end 60a is pivotally supported on a stationary frame 1a of the housing 1 is inserted through the movable support arm 59 directly below the guide rails 58 while extending through an eccentric collar 61 at a right angle relative to the guide rails 58. With this construction, the movable arm 59 can be held in the locked state by turning an actuation knob 60A disposed at the other end 60b of the turn rod 60 so as to slightly raise up the turn rod 60 with the aid of the eccentric collar 61 and bring the turn rod 60 in contact with the guide rails 58.

Taper shafts 52A are projected outward of the opposite ends of the kneading member 52 constituting the mixer 51 for the purpose of position determination while extending along the center axis of the kneading member 52, and moreover, at least one taper pin 52B (two taper pins in the shown embodiment) is likewise projected outward of the opposite ends of the kneading member 52 for the purpose of power transmission at the position radially offset from that of each taper shaft 52A.

On the other hand, a driving rotary member 62 is rotatably supported in the stationary support arm 56 so that it is rotationally driven by a second driving motor 65 via a pulley 63 and a V-shaped endless belt 64. In addition, a driven rotary member 66 is rotatably supported in the movable support arm 59 at the position located opposite to the driving rotary member 62 while extending along the center axis of the kneading member 52.

Figure 10:
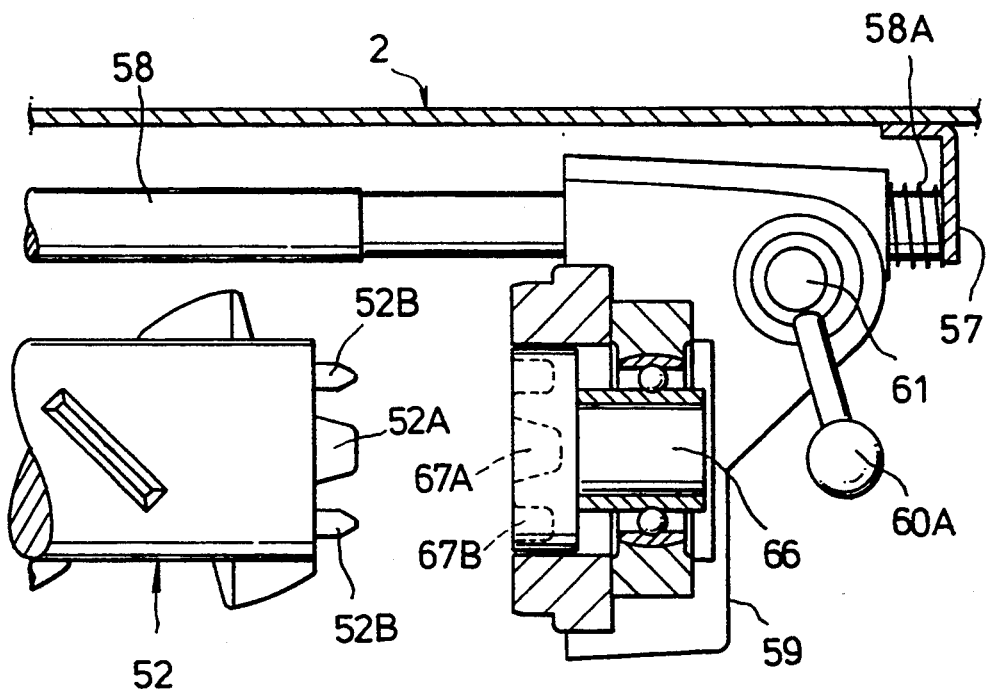
FIG. 10 is a fragmentary enlarged illustrative side view of the flour kneading unit, particularly showing the mixer is partially disassembled from the flour kneading unit.
Figure 11:
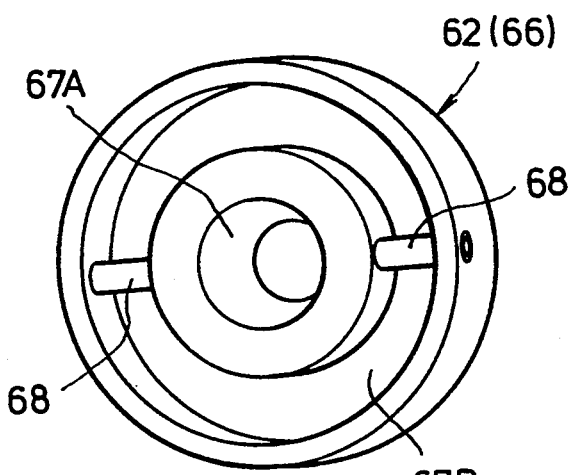
FIG. 11 is a perspective view of a support arm fitting portion of the flour kneading unit.
Figure 12:
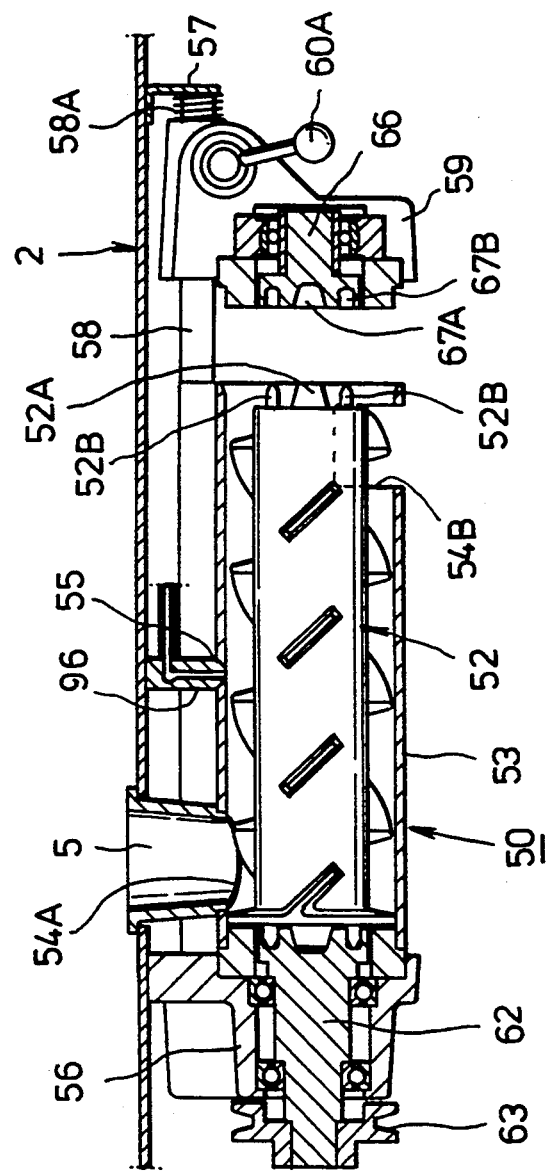
FIG. 12 is a sectional side view of the mixer in the flour kneading unit, particularly showing the mixer partially disassembled from the flour kneading unit.

As shown in FIG. 10 and FIG. 11, a taper hole 67A and an annular engagement groove 67B are formed in each of the driving rotary member 62 and the driven rotary member 66 rotatably supported in the stationary support arm 56 and the movable support arm 59 so that the taper shaft 52A is fitted into the taper hole 67A and the taper pins 52B are engaged with the annular engagement groove 67B. As is best seen in FIG. 11, an opposing pair of spring pins 68 each serving as a stopper adapted to be engaged with the taper pins 52B in the circumferential direction are disposed in the annular engagement groove 67B.

When the mixer 51 is to be mounted in the housing 1, first, the taper shafts 52A projecting outward of the opposite ends of the kneading member 52 along the center axis of the mixer 51 are fitted into the taper holes 67A formed in the driving rotary member 62 and the driven rotary member 66 rotatably held by the stationary support arm 56 and the movable support arm 59 so as to determine the position to be assumed by the mixer 51, while the taper pins 52B likewise projecting outward of the opposite ends of the kneading member 52 are brought in engagement with the annular engagement groove 67B via the spring pins 68 so as to enable the rotational force of the second driving motor 65 to be transmitted to the mixer 51. Subsequently, the opposite ends of the cylinder 53 are detachably supported by the stationary support arm 56 and the movable support arm 59. While the foregoing positional state is maintained, the turn rod 60 is actuated to displace the movable support arm 59 toward the stationary support arm 56 side in the forward direction until the movable support arm 59 is held in the locked state. Thus, the mixer 51 is operatively supported by the stationary support arm 56 and the movable support arm 59 in the clamped state therebetween by the biasing force given by the coil springs 58A.

On the contrary, when the mixer 51 is to be dismounted from the flour kneading unit 50, the actuation knob 60A of the turn rod 60 is turned in a certain direction to release the turn rod 60 from the locked state, and the turn rod 60 is then displaced in the rearward direction with the one end 60a of the turn rod 60 as a fulcrum, as shown in FIG. 9. Thereafter, the movable support arm 59 is slidably displaced along the slide rails 58 against the biasing force given by the coil springs 58A until it is parted away from the one end of the mixer 51, as shown in FIG. 13.

Figure 13:
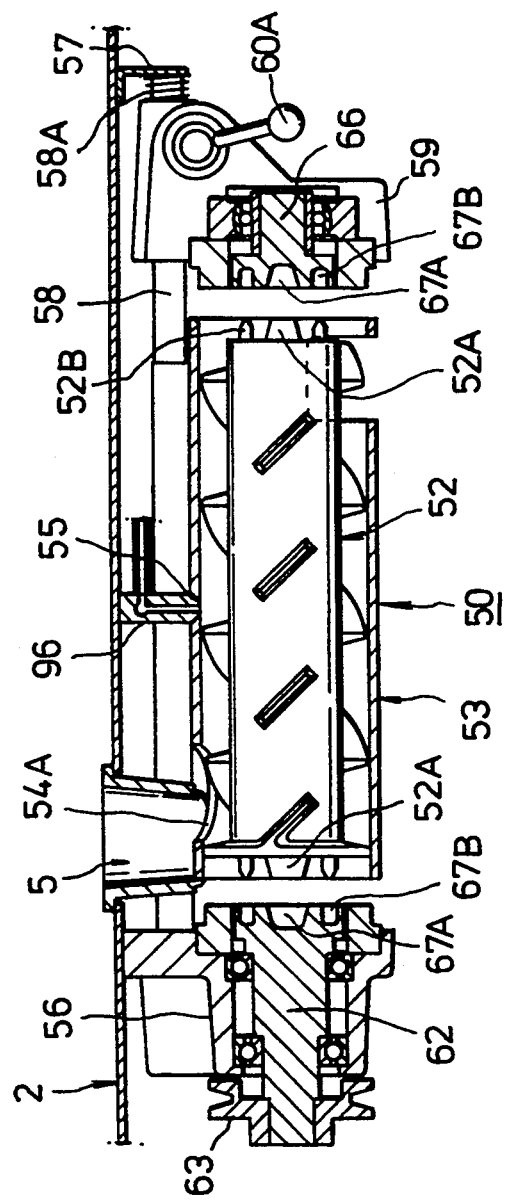
FIG. 13 is another sectional side view of the mixer in the flour kneading unit similar to FIG. 12, particularly showing the mixer partially disassembled from the flour kneading unit.
Figure 14:
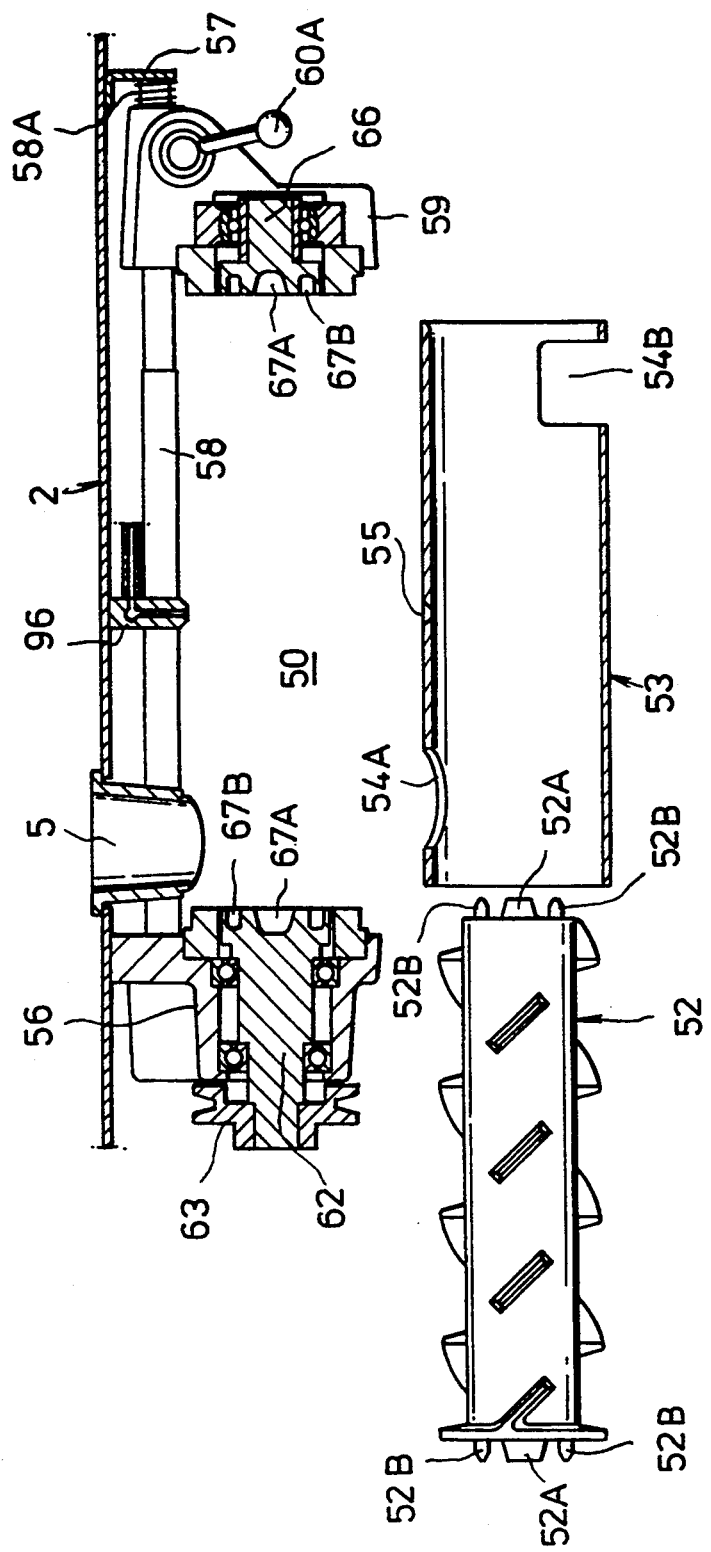
FIG. 14 is an illustrative side view of the flour kneading unit, particularly showing the mixer completely disassembled from the flour kneading unit.

Subsequently, while the mixer 51 is seized with operator's hands, it is displaced in the rearward direction until the other end of the mixer 51 is parted away from the stationary support arm 56, as shown in FIG. 13. Consequently, as shown in FIG. 14, the mixer 51 can now be disassembled from the flour kneading unit 50, and moreover, the kneading member 52 can easily be drawn out of the cylinder 53. Therefore, replacement of the mixer 51 with another one as well as cleaning of the mixer 51 can be achieved simply and easily.

After a scrambled egg-shaped noodle base is prepared in the flour kneading unit 50, it is taken out of the noodle base outfeed port 54B and then delivered to a noodle base storing section 71 of a noodle base milling unit 70 located below the flour kneading unit 50.

Figure 15:
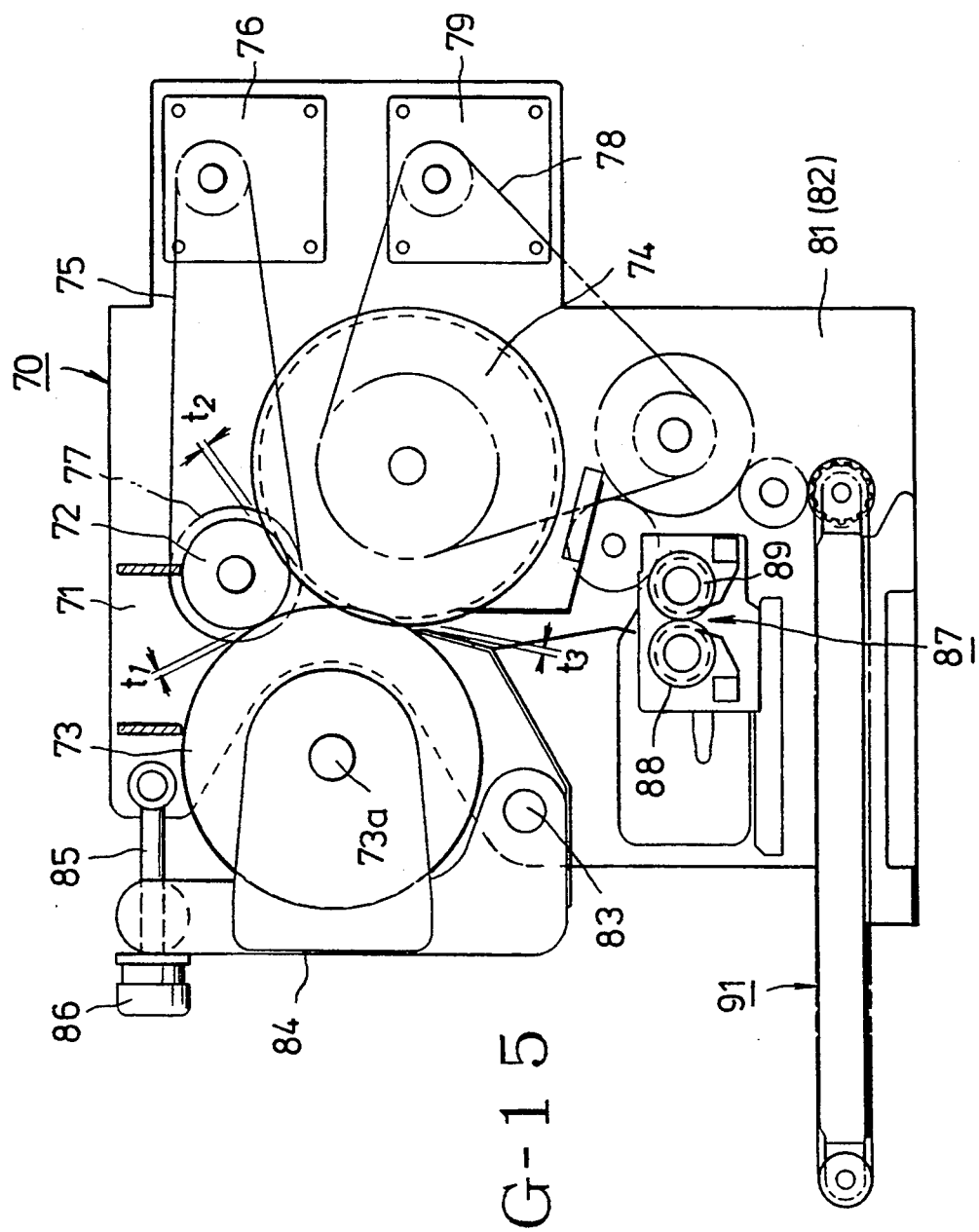
FIG. 15 is a schematic vertical sectional side view of a noodle base milling unit, particularly showing essential components constituting the noodle base milling unit.

As shown in FIG. 15, a first milling roller 72 and a second milling roller 73 each of which is made of a metallic material, e.g., iron or stainless steel and each of which surface is hardened by employing a plasma nitriding process are arranged in the face-to-face relationship below the noodle base storing section 71 of the noodle base milling unit 70 while a gap $t_1$ is kept therebetween. In addition, a third milling roller 74 made in the same manner as the first milling roller 72 and the second milling roller 73 is arranged below the first milling roller 72 and the second milling roller 73 while a gap $t_2$ is kept between the first milling roller 72 and the third milling roller 74 and a gap $t_3$ is kept between the second milling roller 73 and the third milling roller 74.

The first milling roller 72 and the third milling roller 74 are rotatably supported between support frames 81 and 82 which are fixedly arranged in the housing 1. The first milling roller 72 is rotationally driven by a third driving motor 76 via an endless chain belt 75 while the first milling roller 72 and the second milling roller 73 mesh with each other via gears 77 so as to allow them to be rotated in synchronization with each other. On the other hand, the third milling roller 74 is rotationally driven by a fourth driving motor 79 via an endless chain belt 78 independently of the first milling roller 72. With this construction, the first milling roller 72, the second milling roller and the third milling roller 74 are rotated at the substantially same circumferential speed.

A support shaft 73a for the second milling roller 73 is rotatably supported between both the support frames 81 and 82 by a pair of turnable support arms 84 adapted to turn about a shaft 83 in the forward/rearward direction, i.e., in such a direction that the second milling roller 73 is displaced toward or away from the first milling roller 72 and the third milling roller 74.

In FIG. 15 and FIG. 16, reference numeral 85 designates an opening/closing lever which serves to support the turnable support arms 84. As shown in FIG. 16, when the opening/closing lever 85 is turned in the upward direction, the turnable support arms 84 are released from the supported state. Subsequently, as an adjustment dial 86 serving also as a stopper threadably fitted onto the male-threaded fore end part of the opening/closing lever 85 is adjustably rotated, the turnable support arms 84 are turned in the forward/rearward direction, whereby the gap $t_1$ between the first milling roller 72 and the second milling roller 73 as well as the gap $t_3$ between the second milling roller 73 and the third milling roller 74 can finely be adjusted within the range of 1 to 3 mm so as to adjust the thickness of a product of ribbon-shaped or band-shaped noodle.

At this time, the gap $t_2$ between the first milling roller 72 and the third milling roller 74 is kept unchangeable to such an extent that they do not contact with each other, while the gap $t_1$ between the first milling roller 72 and the second milling roller 73 is set to be equal to or appreciably larger than the gap $t_3$ between the second milling roller 73 and the fourth milling roller 74.

In operation, when a predetermined quantity of scrambled egg-shaped noodle base prepared in the flour kneading unit 50 is accumulatively stored in the noodle base storing section 71 of the noodle base milling unit 70, it is rolled in the space between the first milling roller 72 and the second milling roller 73 by its own dead weight to prepare noodle band as both the milling rollers 72 and 73 are rotated. After completion of the first milling step, the noodle band is conducted to the upstream side of the space between the second milling roller 73 and the third milling roller 74.

At this time, the gap $t_3$ is kept between the second milling roller 73 and the third milling roller 74. When the third milling roller 74 is not rotated, i.e., it is kept stopped, the noodle band is successively squeezed on the upstream side of the space between the second milling roller 73 and the third milling roller 74 without any passage of the noodle band therebetween, whereby it is accumulatively filled on the upstream side of the foregoing space in the folded state while it is pressurized.

Subsequently, rotation of the third milling roller 74 is started with some delay when it is detected that the noodle band is adequately accumulated on the upstream side of the space between the second milling roller 73 and the third milling roller 74 in the pressurized state. As the second milling roller 73 is rotated, the noodle band is rolled in the space between the second milling roller 73 and the third milling roller 74 so that another noodle band is prepared during a second milling step. On completion of the second milling step, a product of noodle band is delivered to a noodle band cutting unit 87 arranged on the downstream side of the noodle base milling unit 70.

As is apparent from the above description, after the noodle base is subjected to first milling between the first milling roller 72 and the second milling roller 73, a product of noodle band is once accumulatively stored on the upstream side of the space between the second milling roller 73 and the third milling roller 74 in the folded state while the third milling roller 74 is not rotated. Subsequently, when the noodle band is subjected to second milling between the second milling roller 73 and the third milling roller 74 under a condition that the delayed time of rotation of the third milling roller 74 delayed from the time of rotation of the first milling roller 72 and the second milling roller 73 is properly adjusted, the same kneading effect as that attainable with a composite noodle producing process wherein two kinds of noodle bands are milled in the overlapped state can be obtained with the noodle band which has been subjected to secondary milling. The thus obtained noodle band is preferably usable as a noodle such as "wheat vermicelli", "Chinese vermicelli" or the like of which foodstuff toughness is significantly taken into account. Since the noodle having high foodstuff toughness as mentioned above is hardly elongated when it is cooked in boiled water, it is practically possible to preliminarily cook a considerably large quantity of noodle in boiled water in consideration of the prospective frequency of customer's requests of order.

Otherwise, when rotation of the third milling roller 74 is started at the time earlier than the aforementioned delayed time, noodle band milled in the space between the first milling roller 72 and the second milling roller 73 is twice milled in the downstream space between the second milling roller 73 and the third milling roller 74 as it is. The thus prepared noodle band which has been kneaded to small extent is preferably usable as a noodle such as "buck-wheat vermicelli" or the like. In addition, since this kind of noodle is few pressurized and contains many voids, it can cooked in boiled water for a short time.

The noodle band cutting unit 87 is composed of an opposing pair of cutting rollers 88 and 89, and the noodle band milled in the noodle base milling unit 70 is delivered to the space between the cutting rollers 88 and 89 so as to cut the noodle band to a plurality of ribbon-shaped noodles. After completion of the cutting operation, the ribbon-shaped noodles are caused to fall down on a chain conveyor 91 which in turn conveys the ribbon-shaped noodles to an outlet port (not shown) formed on the front surface side of the housing 1. It should be noted that driving of the cutting rollers 88 and 89 in the noodle band cutting unit 87 as well as driving of the chain conveyor 91 serving as ribbon-shaped noodle conveying means are simultaneously achieved by the fourth driving motor 79 for driving the third milling roller 74 in the noodle base milling unit 70.

In FIG. 2, reference numeral 92 designates a kneading water feeding unit for feeding kneading water W to the mixer 51. The kneading water feeding unit 92 feeds kneading water W received in a water tank 93 to the kneading water ejecting nozzle 96 with the aid of a pump 94 and a flow rate regulator 95 wherein the kneading water ejecting nozzle 96 is oriented toward the mixer 51 of the flour kneading unit 50.

In addition, in the drawing, reference numeral 100 designates an accommodating space which is located at the lower part of the housing 1. A controlling unit (not shown) for the quantitative flour feeding unit 10 is accommodated in the accommodating space 100.

While the present invention has been described above with respect to a single preferred embodiment thereof, it should of course be understood that the present invention should not be limited only to this embodiment but various change or modification may be made without departure from the scope of the present invention as defined by the appended claims.

What is claimed is:

1. An automatic noodle making machine having a housing and including a mixer for a flour kneading unit into which flour and water is dispensed for kneading comprising:

said mixer including a cylinder for receiving the flour and water and a kneading member removably located within said cylinder;

a stationary support arm and an oppositely disposed movable support arm mounted to said machine housing, each of said support arms having means for supporting one end of said cylinder and for rotatably supporting the kneading member therein for rotation within the cylinder; and means for moving said movable support arm axially of the mixer (a) away from said stationary support arm to permit detachment of said mixer from between said support arms and removal of said kneading member from said cylinder, and (b) toward said stationary support arm to permit mounting of said mixer between said support arms.

2. The machine according to claim 1, wherein the machine housing has forward and rearward portions, and wherein opposite ends of said mixer are operatively supported in a lateral direction relative to a direction defined by the forward and rearward portions of said machine housing.

3. The machine according to claim 1, further comprising a pair of guide rails extending in parallel with each other and arranged between said stationary support arm and a bracket fixedly secured to said housing, said movable support arm slidably mounted for displacement on said guide rails.

4. The machine according to claim 3, further comprising spring means disposed on said guide rails to bias said movable support arm toward the stationary support arm by the resilient force provided by said spring means.

5. The machine according to claim 3 wherein said guide rails extend through said movable support arm.

6. The machine according to claim 1 wherein said mixer supporting means at each of said support arms comprises an outer section on which said cylinder is held against rotation and an inner rotatable section for mounting said kneading member.

7. The machine according to claim 6 further comprising means for rotating the rotatable section of one of said supporting means on one of said support arms.

8. The machine according to claim 6 wherein said kneading member has a plurality of tapered pins at each end and said inner rotatable section of said supporting means has tapered slots into which said tapered pins are inserted.

9. The machine according to claim 1 further comprising means for locking said movable arm in position with the mixer in place.

10. The machine according to claim 3 further comprising means for locking said movable arm in position with the mixer in place, said locking means engaging one of said guide rails.

11. The machine according to claim 10 wherein said locking means further comprises a turn rod to turn said locking means to and away from a position of engaging one of said guide rails.

* * * * *